No. 862,155. PATENTED AUG. 6, 1907.
J. T. HAMBAY.
RAILWAY TERMINAL FOR CAMBERED BRIDGES.
APPLICATION FILED NOV. 20, 1906.
5 SHEETS—SHEET 1.
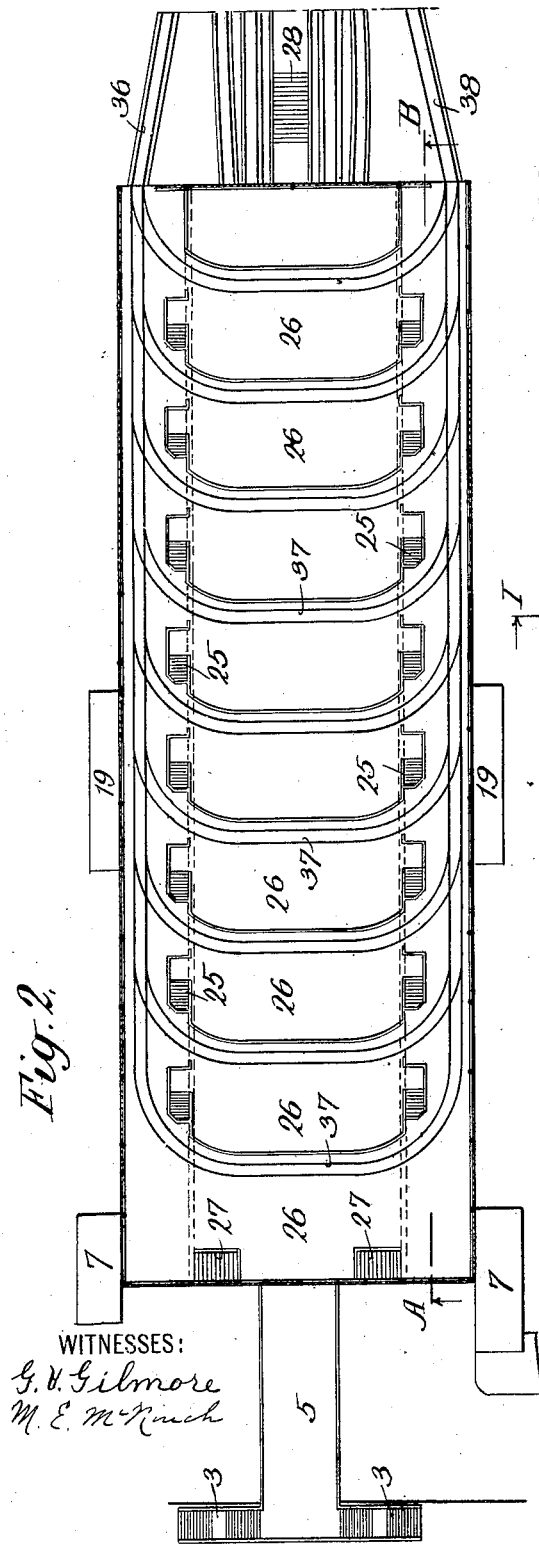
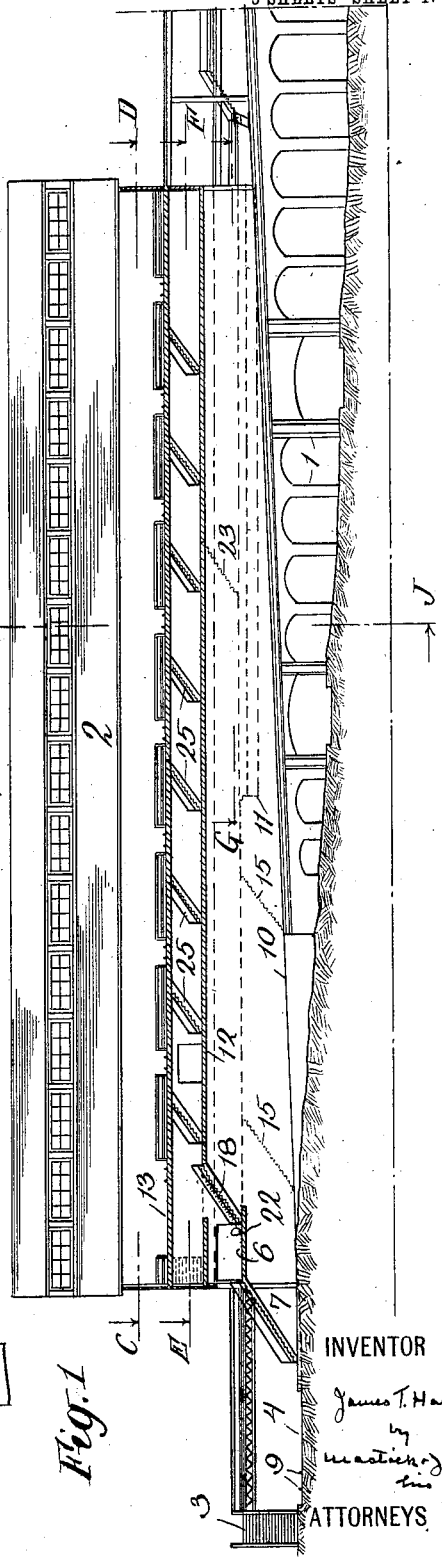
WITNESSES:
INVENTOR
ATTORNEYS

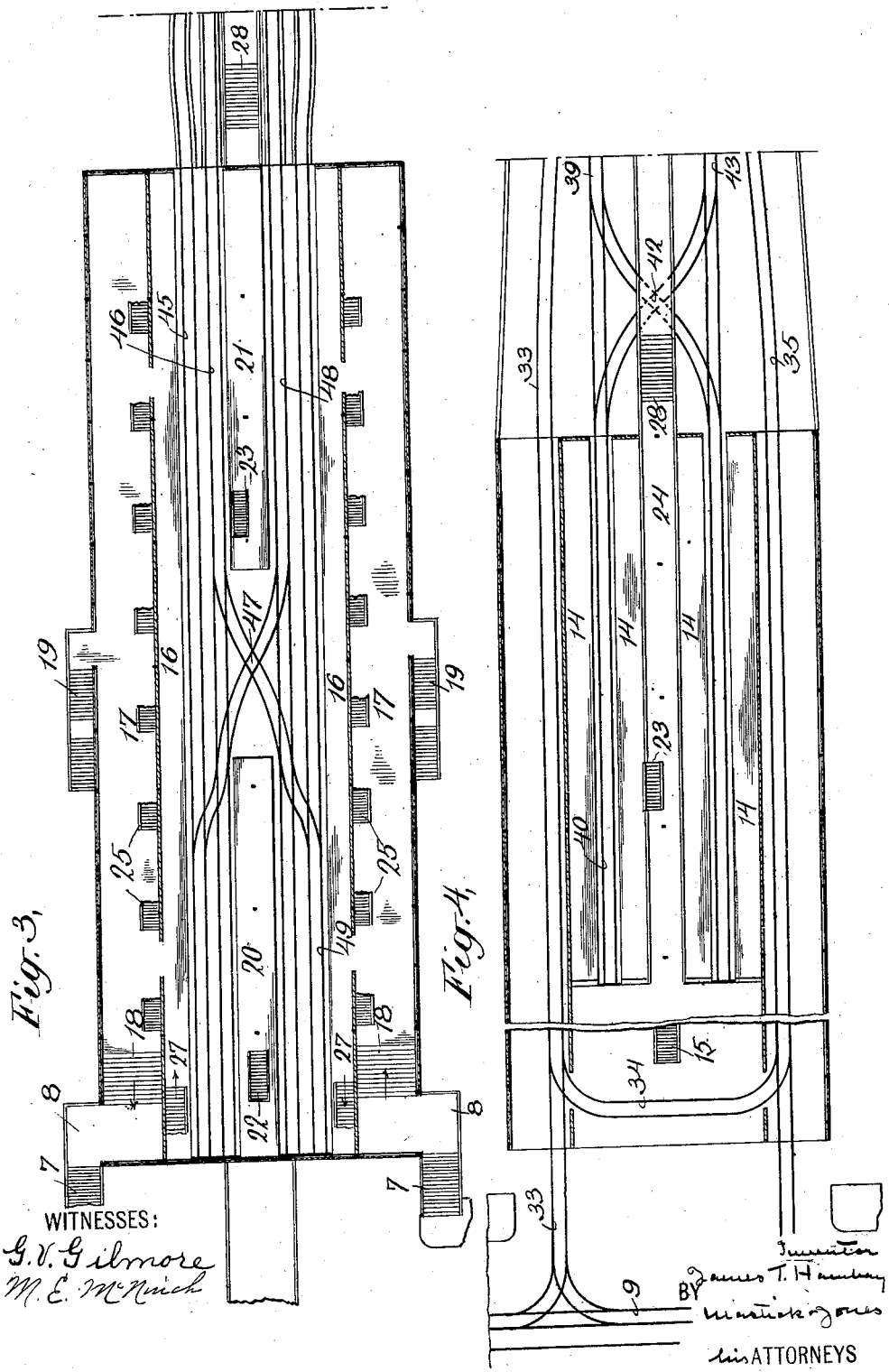

No. 862,155.
PATENTED AUG. 6, 1907.
J. T. HAMBAY.
RAILWAY TERMINAL FOR CAMBERED BRIDGES.
APPLICATION FILED NOV. 20, 1906.
5 SHEETS—SHEET 3.
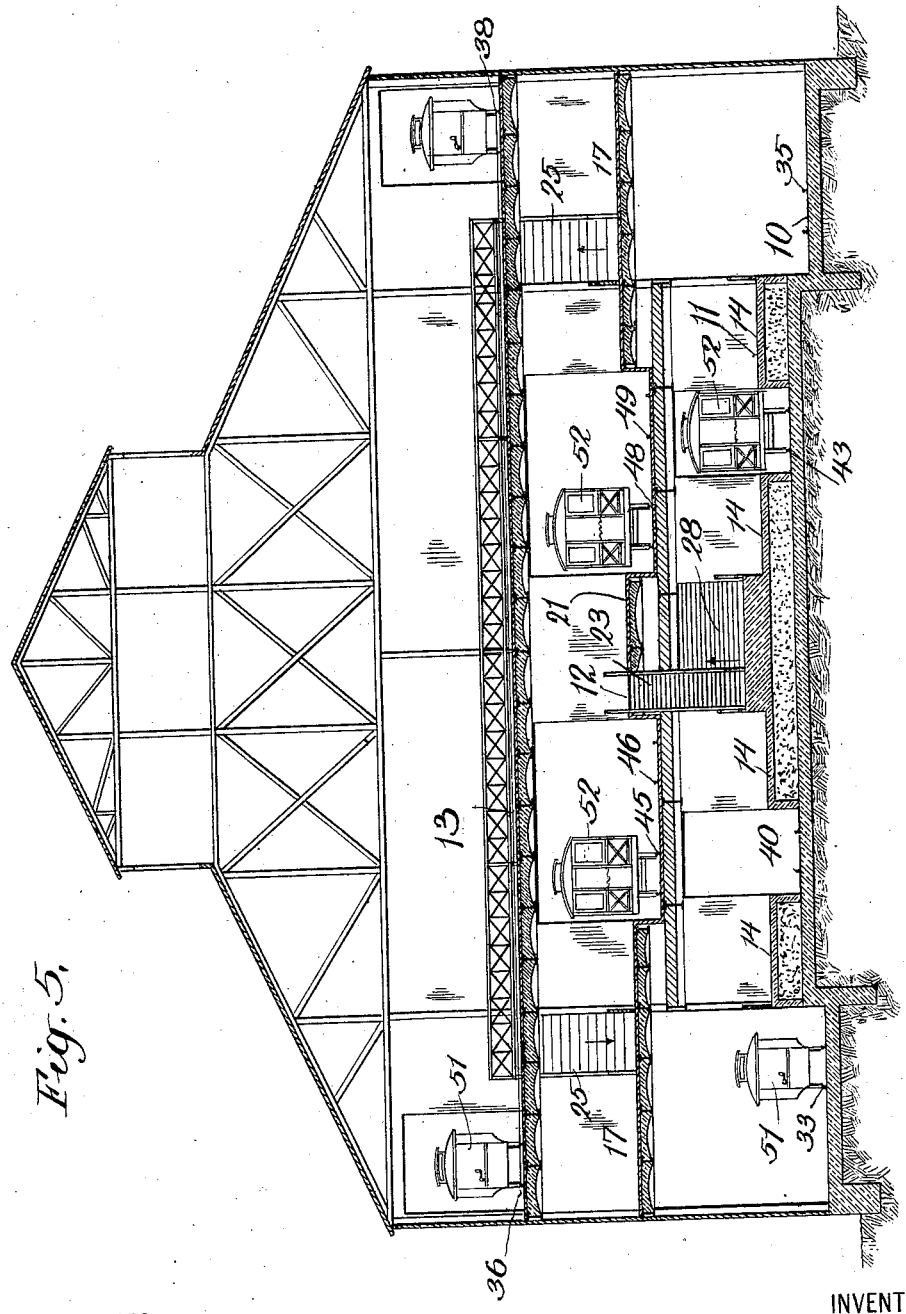
WITNESSES:
INVENTOR
BY
ATTORNEYS

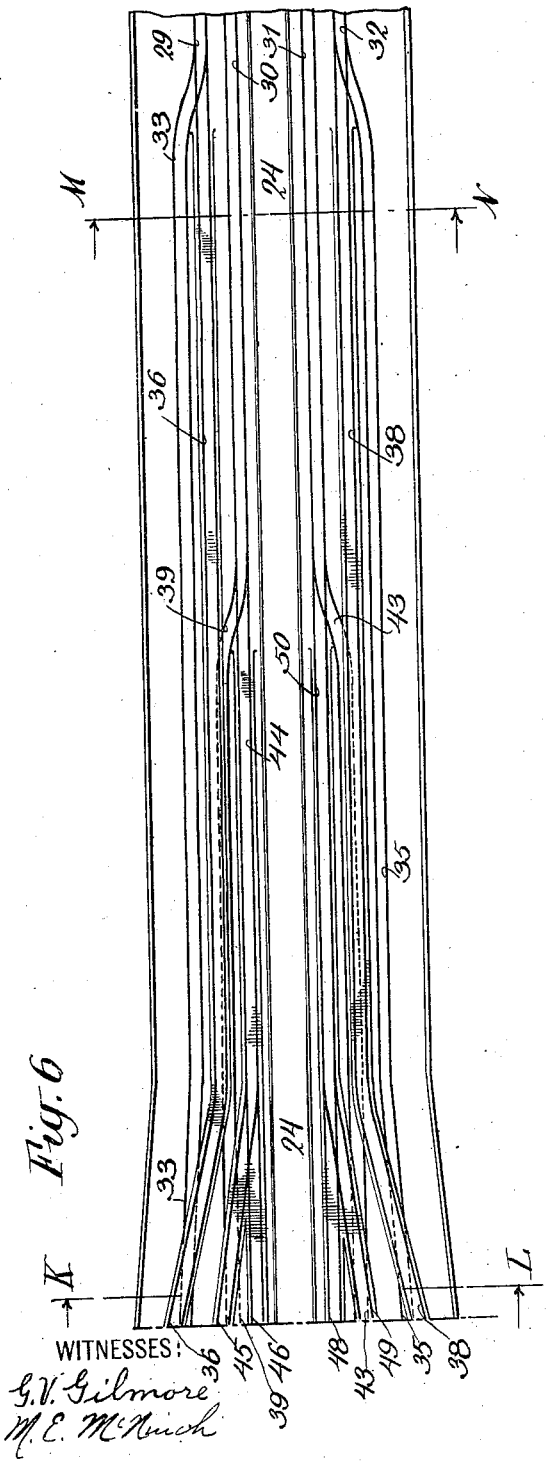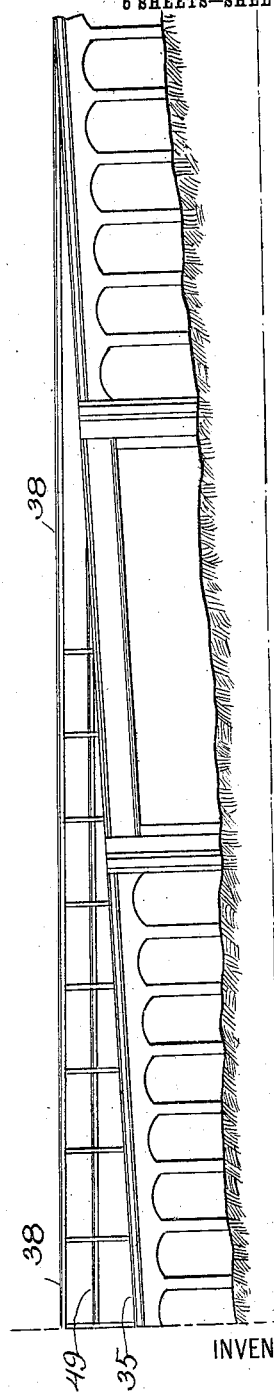

No. 862,155.
PATENTED AUG. 6, 1907.
J. T. HAMBAY.
RAILWAY TERMINAL FOR CAMBERED BRIDGES.
APPLICATION FILED NOV. 20, 1906.
5 SHEETS—SHEET 5.
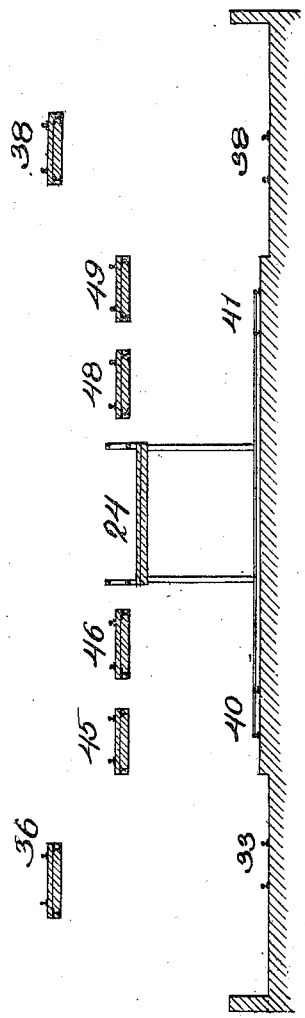
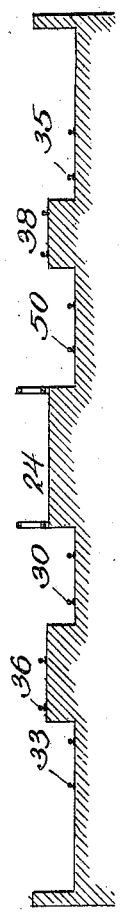
WITNESSES:
INVENTOR
BY
his ATTORNEYS

UNITED STATES PATENT OFFICE.

JAMES T. HAMBAY, OF NEW YORK, N. Y.

RAILWAY-TERMINAL FOR CAMBERED BRIDGES.

No. 862,155.  Specification of Letters Patent.  Patented Aug. 6, 1907.

Application filed November 20, 1906. Serial No. 344,280.

*To all whom it may concern:*

Be it known that I, JAMES T. HAMBAY, a citizen of the United States, residing at New York city, in the county of New York and State of New York, have invented a certain new and useful Improvement in Railway-Terminals for Cambered Bridges, of which the following is a specification.

My invention relates to an improvement in railway terminals having special reference to such terminals as applied to cambered bridges, and the object of my invention is to increase the practicable available area of the terminal without materially increasing the ground space and at the same time to increase the facility of handling the cars or trains and of switching them from one track to another of said terminal, thus providing storage space for the cars in case of a block.

In the following I have described one adaptation of my invention as applied to one terminal of a cambered bridge.
In the drawings Figure 1 is a longitudinal sectional elevation along the line A—B of Fig. 2. Fig. 2 is a sectional plan of the structure shown in Fig. 1 along the line C—D. Fig. 3 is a sectional plan of the structure shown in Fig. 1 along the line E—F. Fig. 4 is a sectional plan of the structure shown in Fig. 1 along the line G—H. Fig. 5 is a cross-sectional view of the structure shown in Fig. 1 along the line I—J. Fig. 6 is a plan view of the track system as it approaches the terminal, the left end of which is adapted to register with the right end of the tracks shown in Fig. 2. Fig. 7 is a side elevation of the structure shown in Fig. 6, the left end of which is adapted to register with the right end of the structure shown in Fig. 1. Fig. 8 is a cross-section of the track system along the line K—L of Fig. 6 and Fig. 9 is a cross-section of the track system along the line M—N of Fig. 6.

Similar numerals indicate similar parts throughout the several views.

As illustrated in the drawings 1 indicates the abutments of one end of a cambered bridge over which the terminal 2 is built.

3 indicate stairways from the street 4 to the approach 5 leading to the passageway 6 in the terminal. Access to passageway 6 may also be had by means of stairways 7 from the street 4 to platform 8 opening to said passageway. Street railway tracks 9 may be conveniently placed on street 4 as desired. The terminal as shown comprises four stories or track levels 10, 11, 12 and 13 respectively, on each of which track systems are adapted to be placed. The level 10 is substantially the street level or level of the abutments of the end of the bridge, to which access may be had directly from the street. Level 11 is next above and access is had to platforms 14 by means of stairways 15 from level 10. Level 12 is next above level 11 and access is had to platforms 16 communicating with halls 17 either by stairways 18 from passageway 6 to halls 17 or by stairways 19 directly from the street to halls 17. Access is had to platforms 20 and 21 on level 12 by stairway 22 leading from passageway 6 and by stairways 23 leading from foot path 24 on level 10 respectively. Level 13 is the uppermost level as illustrated and access to it is had from halls 17 by means of stairways 25 leading to platforms 26 or by stairways 27 leading from platforms 16 to platforms 26. 28 is a stairway in foot-path 24 leading from the lower to the higher level of the foot path.

Approaching the terminal from the bridge along the foot path 24, in the direction of the arrow on said foot path as shown in Fig. 6, are four sets of tracks 29, 30, 31 and 32 respectively, tracks 29 and 30 being the ingoing main line tracks and 31 and 32 being the outgoing main line tracks. At a suitable level on the camber of the bridge and before reaching the terminal, track 33 branches off from ingoing main line track 29 and descends to level 10 where it may connect with track 9 on the street or curve by track 34 to connect with track 35 branching into outgoing main line track 32. The other branch 36, of incoming main line track 29 ascends to level 13 where it curves around by tracks 37 into track 38 branching into outgoing main line track 32. At another suitable level on the camber of the bridge and before reaching the terminal, track 39 branches off from ingoing main line track 30 and descends to level 11 where it runs into the terminal as tracks 40 and 41, a crossing 42 under the foot path 24 serving to permit the trains to run in on track 41 while at the same time it serves to permit trains from track 40 to run out on track 43 branching into out going main line track 31. The other branch 44, of incoming main line track 30 divides again before entering the terminal into tracks 45 and 46 entering the terminal on level 12, a crossing 47 on level 12 serving to permit the trains running in on track 46 to pass onto tracks 48 or 49 as well while at the same time it permits trains on tracks 45 and 46 to run out on track 48 branching into branch 50 branching into out going main line track 31.

Main line tracks 29 and 32 and their branches may be used for trolley cars, as shown at 51 in Fig. 5, while main line tracks 30 and 31 may be used for trains as shown at 52, in said Fig. 5 or such other arrangement of cars may be made as is desirable.

By branching off the different tracks at different points on the camber a low grade to the different levels of the terminal is obtained although sufficient elevation is obtained for tracks 33 and 35 to pass under tracks 36 and 38 and for tracks 40 and 41 to pass under tracks 45 and 46, 48 and 49 respectively so that there are no grade crossings of the respective ingoing and outgoing main line tracks.

It is obvious that by means of the crossings 47 and 42 in Figs. 3 and 4 respectively cars may be shfited from track to track as desired and that where sufficient space is available the crossings may be omitted and the incoming tracks curved to connect with the outgoing tracks as shown in connection with levels 10 and 13 in Figs. 4 and 2 respectively It is further obvious that while only four levels are shown in the drawings that others may be added as long as the grade to the various levels from the bridge does not become too great. By the word "bridge" or "bridge structure" I mean not only to include the bridge proper but the abutments thereof.

The tracking and switching means employed in connection with the terminal will be clear to those skilled in the art as well as the great economy of space and efficiency of service obtained.

I do not restrict myself to any of the details as shown and described as they are illustrative of the general principles of the invention only but

What I claim is:—

1. A terminal track system for a cambered bridge comprising a main line crossing said bridge and branches from said main line taken off of said main line at different elevations of the bridge structure and running into the terminal on different levels.

2. A terminal track system for a cambered bridge comprising a main line crossing said bridge, branches from said main line taken off of said main line at different elevations of the bridge structure and running into the terminal on different levels and means for transferring cars from one level to the other of said main line.

3. A terminal track system for a cambered bridge comprising a plurality of main lines crossing said bridge and branches from each of said main lines taken off of said main lines at different elevations of the bridge structure and running into the terminal on different levels, the branches from said main lines being so arranged that they run under and over each other before they reach the terminal.

4. A terminal track system for a cambered bridge comprising main ingoing and outgoing lines crossing said bridge, branches from each of said main lines taken off of said main lines at different elevations of the bridge structure and running into the terminal on different levels and means for transferring the cars from the incoming to the outgoing main lines.

5. A terminal track system for a cambered bridge comprising a main line crossing the bridge and branches from said main line running into the terminal at different levels.

6. A terminal track system for a cambered bridge comprising a main line crossing the bridge and branches from said main line running into the terminal at different levels and under or over each other.

7. A terminal track system for a cambered bridge comprising main incoming and outgoing lines crossing the bridge, branches from each of said main lines running into the terminal at different levels and means permitting the cars to pass from the incoming to the outgoing lines.

8. A terminal track system for a cambered bridge comprising main incoming and outgoing lines crossing the bridge, branches from each of said main lines running into the terminal at different levels and under or over each other so that cars may pass from the incoming to the outgoing lines without the tracks crossing each other.

9. A terminal track system for a cambered bridge comprising main incoming and outgoing lines crossing the bridge, branches from said main lines running into the terminal at different levels, means for switching some of said branches into connection with either the incoming or outgoing lines and means permitting other of said branches to pass under or over the former to connect their incoming or outgoing lines.

In testimony whereof I have hereunto signed my name in the presence of two subscribing witnesses.

JAMES T. HAMBAY.

Witnesses:
ROBERT W. ASHLEY,
SEABURY C. MASTICK.